(12) United States Patent
Puglisi

(10) Patent No.: US 10,191,570 B1
(45) Date of Patent: Jan. 29, 2019

(54) COMPUTER MOUSE HAND AND WRIST SUPPORT APPARTUS WITH ENHANCED COMFORT

(71) Applicant: Mario Puglisi, Surrey (CA)

(72) Inventor: Mario Puglisi, Surrey (CA)

(*) Notice: Subject to any disclaimer, the term of this patent is extended or adjusted under 35 U.S.C. 154(b) by 0 days.

(21) Appl. No.: 15/866,204

(22) Filed: Jan. 9, 2018

Related U.S. Application Data

(60) Provisional application No. 62/445,427, filed on Jan. 12, 2017.

(51) Int. Cl.
*G06F 3/039* (2013.01)
*A47B 21/03* (2006.01)

(52) U.S. Cl.
CPC .......... *G06F 3/039* (2013.01); *A47B 21/0371* (2013.01)

(58) Field of Classification Search
CPC ... G06F 3/039; G06F 3/0395; A47B 21/0371; A47B 2021/0378; A47B 2021/0385; A47B 2021/0392; A47B 2021/0307; A47B 2200/0091; A47B 2200/0092; A47B 2200/0095; A47C 16/00; A47C 7/54
USPC .................. 248/118, 118.1; 602/21; 482/44; 400/715; 434/166
See application file for complete search history.

(56) References Cited

U.S. PATENT DOCUMENTS

| | | | |
|---|---|---|---|
| 5,340,067 A | 8/1994 | Martin | |
| 5,370,346 A * | 12/1994 | Long .................. | A47B 21/0371 248/118.5 |
| 5,398,896 A * | 3/1995 | Terbrack ............ | A47B 21/0371 248/118 |
| 9,360,951 B2 * | 6/2016 | Moy ...................... | G06F 3/039 |
| 2004/0133137 A1 * | 7/2004 | Hargis ................. | A61F 5/0118 602/21 |
| 2006/0118679 A1 | 6/2006 | Delgado | |
| 2012/0168575 A1 | 7/2012 | Atzmon | |
| 2014/0081188 A1 * | 3/2014 | Hargis ................. | A61F 5/0118 602/7 |

* cited by examiner

*Primary Examiner* — Christopher Garft
(74) *Attorney, Agent, or Firm* — Plager Schack; Mark H. Plager; Eric Liou

(57) ABSTRACT

A support apparatus for use to support a user's hand region in a neutrally aligned position during use of a computer mouse on a flat surface is provided. The support apparatus includes a main body disposed on the flat surface, and a cushion member coupled to the main body and having a pair of side walls continuously connected to a lower wall to form a generally U-shaped member, the U-shaped member having a slanted cutout that extends from the front end of the U-shaped member to one of the pair of side walls of the cushion member. The cushion member receives the user's hand region to permit the pair of side walls to conform around the wrist and the lower wall of the cushion member to conform to the palm portion. The cushion member supports the user's hand region as the fingers and thumb perform work with the computer mouse.

12 Claims, 4 Drawing Sheets

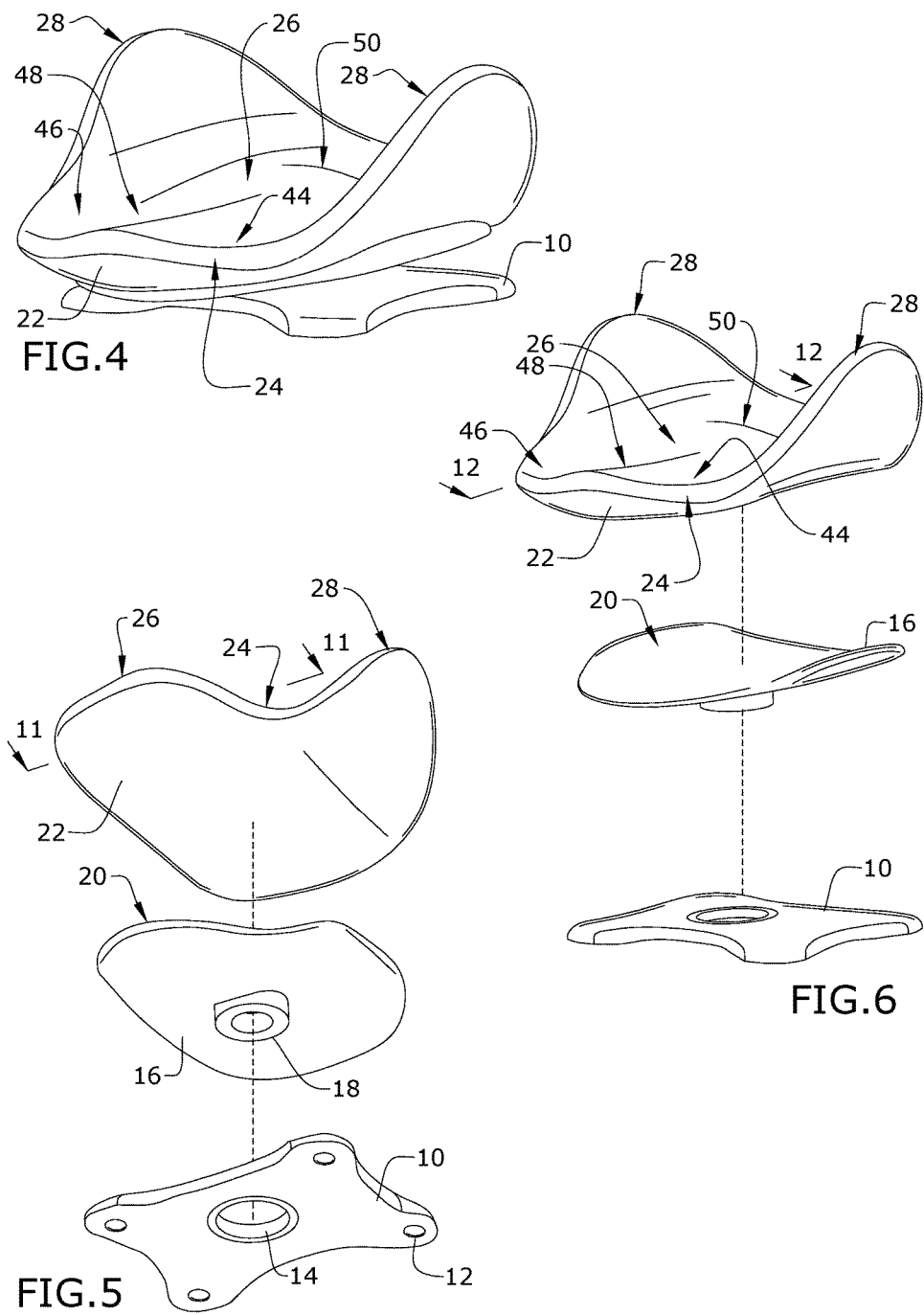

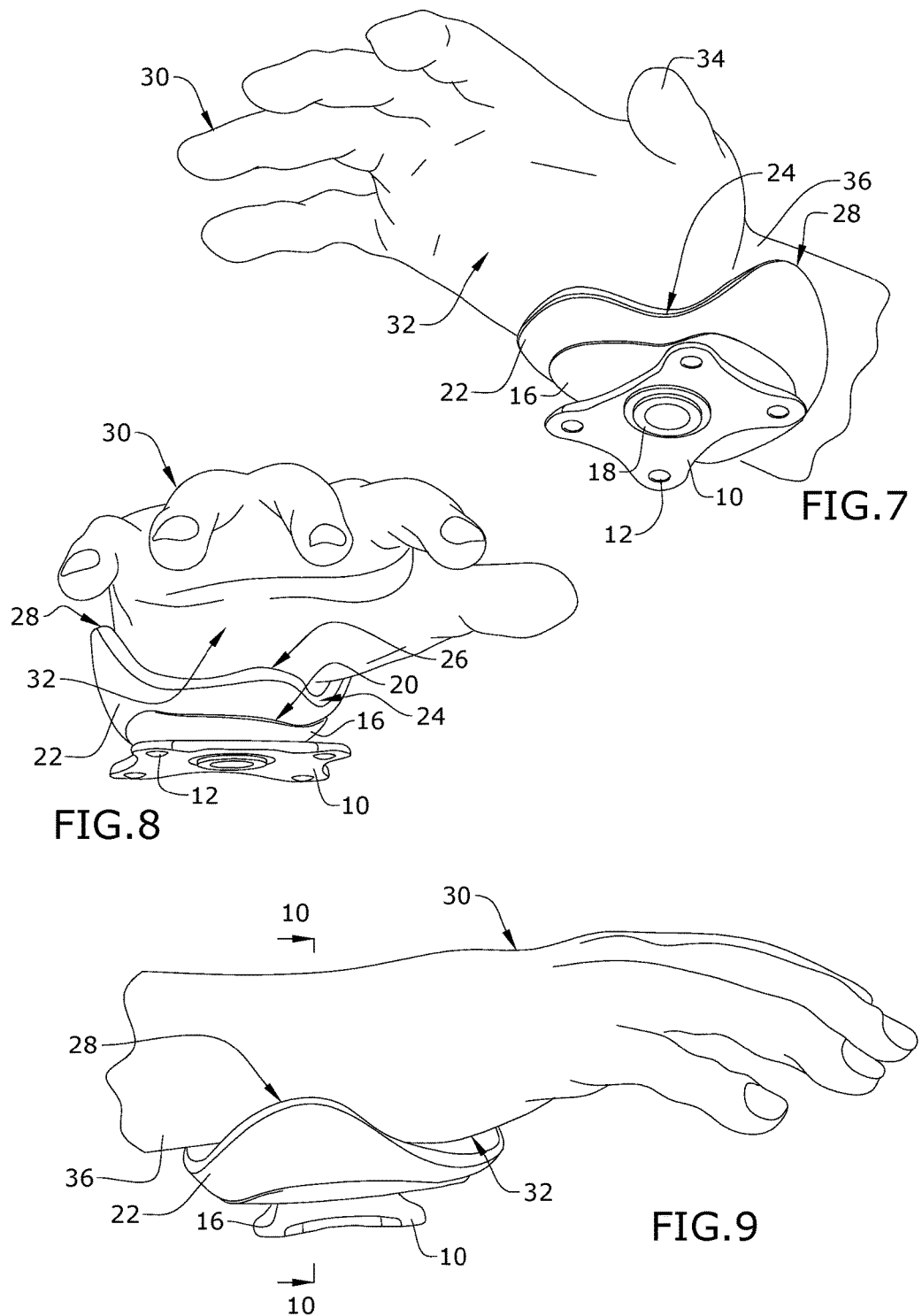

COMPUTER MOUSE HAND AND WRIST SUPPORT APPARTUS WITH ENHANCED COMFORT

RELATED APPLICATION

The application claims priority to provisional patent application U.S. Ser. No. 62/445,427 filed on Jan. 12, 2017, the entire contents of which is herein incorporated by reference.

BACKGROUND

The embodiments herein relate generally to hand and wrist support apparatuses. More specifically, embodiments of the present invention relate to a support apparatus with enhanced comfort to support a user's hand and wrist when using a computer mouse.

A computer mouse is a hand-held device used to transmit signals to a computer to control the directional motion of a pointer on a display and facilitate the selection of a menu item. The user's hand and/or fingers rest on the mouse, which glides on a flat surface such as a table or mouse pad. The fingers depress one or more buttons on the mouse to input a selection of a menu item shown on the computer's display. The use of a computer mouse often causes the user's hand and/or wrist to droop down out of a neutrally aligned position, which places significant stress, strain and/or pressure on the hand and wrist area. Over time, the user's hand and wrist may be subject to discomfort, pain and/or injury if not maintained in the neutrally aligned position.

Several hand and/or wrist support devices exist as disclosed in U.S. Pat. No. 5,340,067 and U.S. Patent Application Publications 2006/0118679 and 2012/0168575, which disclose devices to support the user's hand and/or wrist. However, these devices are limited because they do not comprise a form-fitting member that fully supports the user's hand area, which conforms to the user's palm and cradles the wrist. Further these devices limit or partially hinder the user's range of motion of the fingers and/or thumb, which can make it difficult for the user to comfortably operate the computer mouse.

As such, there is a need in the industry for a hand and wrist support apparatus that addresses the limitations of the prior art, which permits the user to operate a computer mouse with the hand and wrist in the neutrally aligned position to ensure maximum support and comfort. There is a further need for the hand and wrist support apparatus to permit a free range of motion of the thumb and fingers so the user can operate the mouse with ease.

SUMMARY

A support apparatus for use to support a hand region of a user in a neutrally aligned position during use of a computer mouse on a flat surface is provided. The support apparatus is configured to permit freedom of movement of a thumb and fingers of the hand region and conform to a palm portion and a wrist of the hand region. The support apparatus comprises a main body disposed on the flat surface and comprising an upper concave surface and a lower surface, and a cushion member coupled to the upper concave surface of the main body and comprising a pair of side walls continuously connected to a lower wall to form a generally U-shaped member, the U-shaped member comprising a front end and a rear end opposite the front end, the U-shaped member comprising a slanted cutout that extends from the front end of the U-shaped member to one of the pair of side walls of the cushion member, wherein the cushion member is configured to receive the hand region of the user to permit the pair of side walls to conform around the wrist, the lower wall of the cushion member to conform to the palm portion with the fingers and thumb extending beyond the front end of the generally U-shaped member, thereby permitting the cushion member to support the hand region of the user in the neutrally aligned position as the fingers and thumb perform work with the computer mouse.

BRIEF DESCRIPTION OF THE FIGURES

The detailed description of some embodiments of the invention will be made below with reference to the accompanying figures, wherein the figures disclose one or more embodiments of the present invention.

FIG. 4 depicts a perspective view of certain embodiments of the support apparatus;

FIG. 5 depicts an exploded view of certain embodiments of the support apparatus;

FIG. 6 depicts an exploded view of certain embodiments of the support apparatus;

FIG. 7 depicts a bottom perspective view of certain embodiments of the support apparatus shown in use;

FIG. 8 depicts a front perspective view of certain embodiments of the support apparatus shown in use;

FIG. 9 depicts a side perspective view of certain embodiments of the support apparatus shown in use;

DETAILED DESCRIPTION OF CERTAIN EMBODIMENTS

Figure 1:
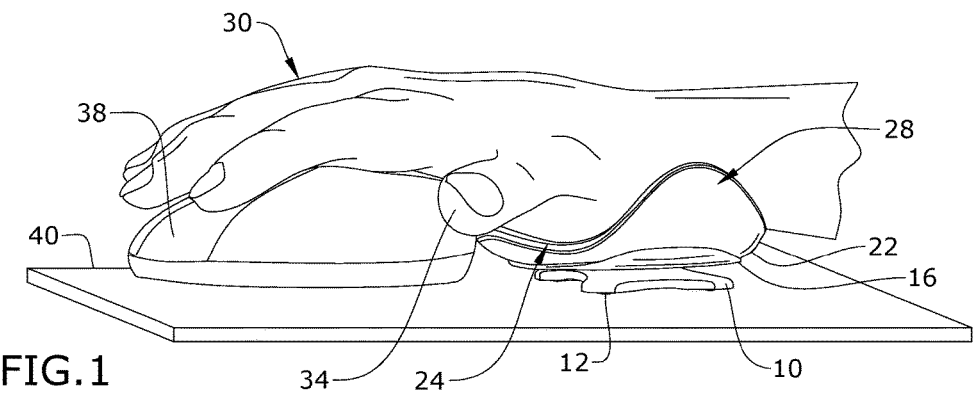
FIG. 1 depicts a side perspective view of certain embodiments of the support apparatus shown in use.

As depicted in FIGS. 1-3 and 7, the support apparatus generally comprises base 10, body 16 and cushion member 22, and is configured to support the hand region of a user in a neutrally aligned position when operating computer mouse 38. The hand region of the user comprises fingers 30 including thumb 34, index, middle, ring and pinky fingers, palm region 32 and wrist 36. The support apparatus conforms to and/or cradles all portions of the hand region including palm region 32 and wrist 36, so that fingers 30 and thumb 34 are free to rest on and maneuver computer mouse 38. Computer mouse 38 is generally operated on a flat surface such as a table and/or mouse pad 40.

As depicted in FIGS. 4-6, base 10 and body 16 are coupled together and preferably made from plastic. However, alternative materials may be used instead including, but not limited to, wood, metal, rubber or other materials. Base 10 comprises central opening 14 and a plurality of protrusions 12 coupled to the bottom surface and positioned proximate the corners of base 10. It shall be appreciated that an alternative number of protrusions 12 may be used instead and arranged on base 10 in various configurations.

Body 16 comprises upper concave surface 20 and lower stem 18, which is configured to be disposed through central opening 14 of base 10. This snap-fit connection permits body 16 and base 10 to be connected together and detached from one another with ease. Upper concave surface 20 of body 16 serves as a seat that supports cushion member 22. It shall be appreciated that base 10 and body 16 can be a single component continuously connected together in an alternative embodiment.

Figure 2:
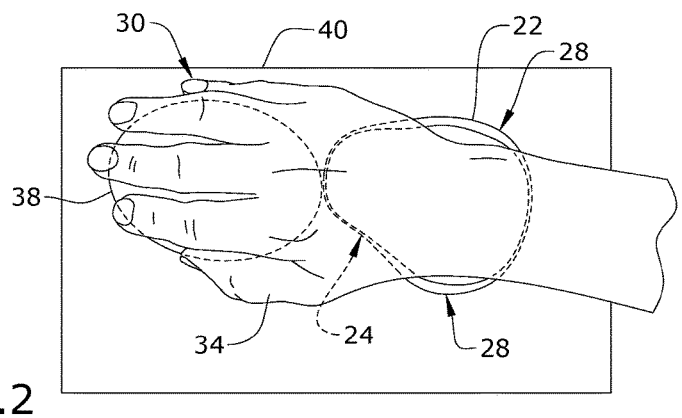
FIG. 2 depicts a top view of certain embodiments of the support apparatus shown in use.
Figure 3:
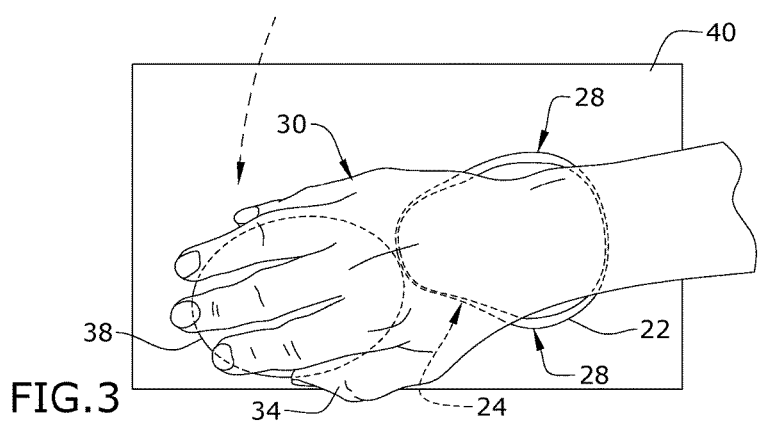
FIG. 3 depicts a top view of certain embodiments of the support apparatus shown in use.
Figure 10:
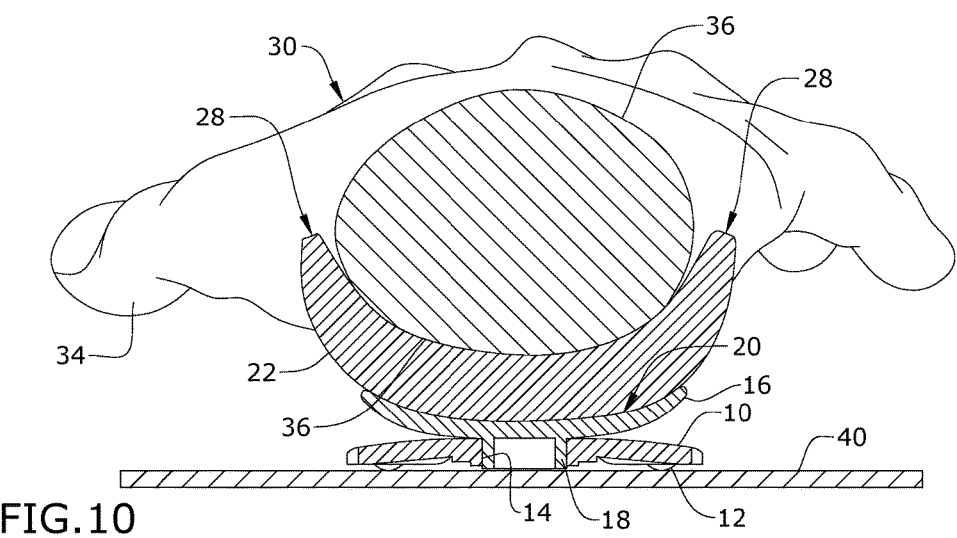
FIG. 10 depicts a section view of certain embodiments of the support apparatus taken along line 10-10 in FIG. 9.

Cushion member 22 is preferably made from a resilient and deformable foam material that is coupled to body 16 by an adhesive glue. However, alternative fastening components such as mechanical fasteners may be used in alternative embodiments. In a preferred embodiment, cushion member 22 comprises a pair of side walls 28 continuously connected to lower wall 26 to form a generally U-shaped member with a front end and a rear end. The U-shaped member comprises slanted cutout 24, which extends from the front end to an intermediate portion of one of the pair of side walls 28 of cushion member 22. In one embodiment of the invention, slanted cutout 24 forms a cutout edge in cushion member 22 that extends along a pathway directed entirely away from the one of the pair of side walls 28 from the side wall to the intermediate portion of the front end of cushion member 22 as depicted in FIGS. 2-3.

Figure 11:
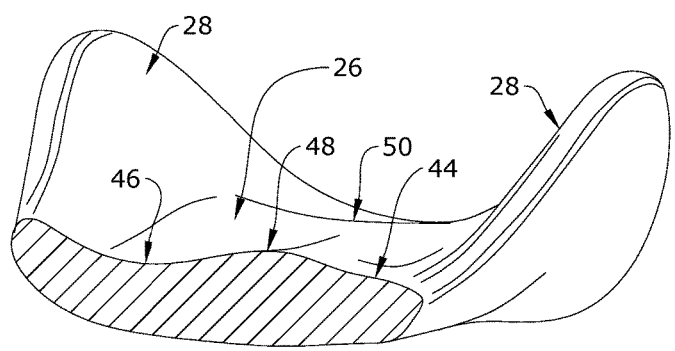
FIG. 11 depicts a cutaway section view of certain embodiments of the support apparatus taken along line 11-11 in FIG. 5.
Figure 12:
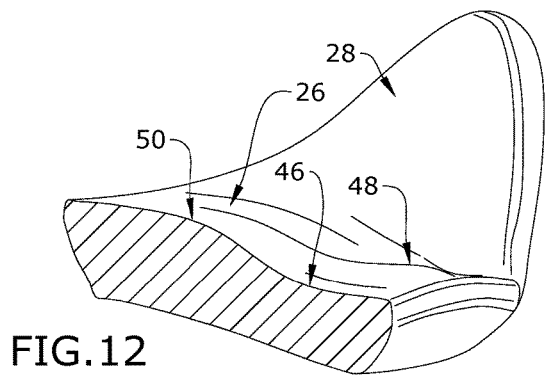
FIG. 12 depicts a cutaway section view of certain embodiments of the support apparatus taken along line 12-12 in FIG. 6.

As depicted in FIGS. 7-9, cushion member 22 is configured to fully support the hand and wrist 36 of the user in the neutrally aligned position by conforming to palm region 32 and cradling wrist 36. The ability of cushion member 22 to serve as a form-fitting member that conforms to palm region 32 is enhanced by the surface of lower wall 26 in cushion member 22. As depicted in FIGS. 4 and 11-12, lower wall 26 of cushion member 22 comprises thenar-hypothenar ridge 48, distal ridge 50, thenar indentation 44 and hypothenar indentation 46.

Thenar-hypothenar ridge 48 extends from the front end to an intermediate portion of cushion member 22 along the surface of lower wall 26. Thenar-hypothenar ridge 48 is configured to extend within space formed by the crease present in the lower portion of palm region 32. Thenar indentation 44 and hypothenar indentation 46 are located on opposing sides of thenar-hypothenar ridge 48 and are configured to receive the fleshy lower portion of palm region 32. Thenar indentation 44 is positioned proximate slanted cutout 24 in cushion member 22. Distal ridge 50 intersects thenar-hypothenar ridge 48 in the intermediate portion of lower wall 26 and extends to connect both side walls 28 together. Distal ridge 50 is configured to contact and support wrist 36 in an elevated position. This prevents the hand and wrist 36 from drooping down out of the neutrally aligned position.

In a preferred embodiment, base 10 comprises approximate dimensions of a 67.5 mm length, 52.5 mm width and 6 mm height, body 16 comprises approximate dimensions of a 77.5 mm length, 60.5 mm width and 15 mm height, and cushion member 22 comprises approximate dimensions of a 102.5 mm length, 86.1 mm width and 44 mm height. However, it shall be appreciated that the dimensions of base 10, body 16 and cushion member 22 may vary.

In operation, the support apparatus is disposed on a flat surface such as mouse pad 40 nearby computer mouse 38. As depicted in FIGS. 1-3 and 7-10, the user rests his/her hand on cushion member 22 of the support apparatus until thenar-hypothenar ridge 48, thenar indentation 44 and hypothenar indentation 46 conform to palm region 32, distal ridge 50 contacts wrist 36, and the pair of side walls 28 extend around and cradle wrist 36. In this position, the hand and wrist of the user are maintained in the neutrally aligned position with fingers 30 and thumb 34 extending beyond the front end of cushion member 22. In one embodiment of the invention, cushion member 22 is configured to receive the hand region of the user so that the intermediate portion of the front end of the U-shaped member is aligned with the middle finger and positioned beneath a central area of palm region 32 as depicted in FIGS. 2-3 and 7-8. Cushion member 22 also provides a large resting area for the hand with the cushion configured to dampen and/or avoid any pressure points the hand is normally subjected to. The support apparatus permits an unobstructed range of motion of fingers 30 and thumb 34 to rest on and operate computer mouse 38. Slanted cutout 24 is positioned beneath thumb 34 to further enhance the range of motion of thumb 34.

The support apparatus permits fingers 30 and thumb 34 to move computer mouse 38 forward, backward and laterally as desired. Protrusions 12 of base 10 glide on mouse pad 40 or any alternate flat surface to follow the movement of the hand.

Figure 13:
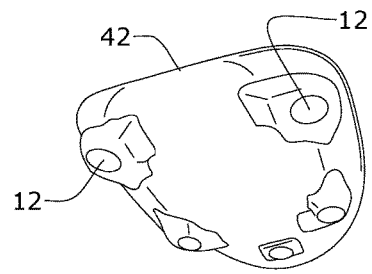
FIG. 13 depicts a bottom perspective view of an alternative embodiment of the support apparatus.

Various modifications can be made to the support apparatus within the scope of the invention. For example, alternate body 42 may comprise protrusions 12 to replace body 16 and eliminate the need for base 10 as depicted in FIG. 13. In this embodiment, cushion member 22 is coupled to alternate body 42, which is disposed on mouse pad 40 or alternative flat surface when the support apparatus is ready for use.

It shall be appreciated that the components of the support apparatus described in several embodiments herein may comprise any alternative known materials in the field and be of any color, size and/or dimensions. It shall be appreciated that the components of the support apparatus described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A support apparatus configured to support a hand region of a user in a neutrally aligned position during use of a computer mouse on a flat surface, the support apparatus configured to permit freedom of movement of a thumb, index, middle, ring and pinky fingers of the hand region and conform to a palm portion and a wrist of the hand region, the support apparatus comprising:
 a main body comprising an upper concave surface and a lower surface; and
 a cushion member coupled to the upper concave surface of the main body and comprising a pair of side walls continuously connected to a lower wall to form a generally U-shaped member, the U-shaped member comprising a front end and a rear end opposite the front end, the U-shaped member being asymmetrical due to a slanted cutout that extends from an intermediate portion of the front end of the U-shaped member to an intermediate portion of one of the pair of side walls of the cushion member, the slanted cutout forming a cutout edge in the cushion member that extends along a pathway directed entirely away from the one of the pair of side walls to the intermediate portion of the front end of the U-shaped member;

wherein the cushion member is configured to receive the hand region of the user so that the intermediate portion of the front end of the U-shaped member is aligned with the middle finger and positioned beneath a central area of the palm portion of the hand region, wherein the cushion member is configured to permit the pair of side walls of the U-shaped member to conform around the wrist, the lower wall of the cushion member is configured to conform to the palm portion with the fingers and thumb extending beyond the front end of the generally U-shaped member, thereby permitting the cushion member to support the hand region of the user in the neutrally aligned position as the fingers and thumb perform work with the computer mouse.

2. The support apparatus of claim 1, wherein the lower wall of the cushion member comprises a thenar-hypothenar ridge extending from the front end of the U-shaped member to an intermediate portion of the lower wall of the cushion member.

3. The support apparatus of claim 2, wherein the lower wall of the cushion member comprises a pair of indentations disposed on opposing sides of the thenar-hypothenar ridge, the pair of indentations comprising a thenar indentation proximate the slanted cutout in the cushion member and a hypothenar indentation.

4. The support apparatus of claim 3, wherein the lower wall of the cushion member comprises a distal ridge intersecting the thenar-hypothenar ridge in the intermediate portion of the lower wall, the distal ridge configured to support the wrist of the user.

5. The support apparatus of claim 4, further comprising a base member coupled to the lower surface of the main body, the base member comprising an upper surface in contact with the main body and a lower surface configured to contact the flat surface.

6. The support apparatus of claim 5, further comprising a plurality of protrusions coupled to the lower surface of the base member and configured to glide on the flat surface.

7. The support apparatus of claim 6, wherein the plurality of protrusions are positioned proximate corners of the base member.

8. The support apparatus of claim 7, further comprising an opening disposed in a central portion in the base member.

9. The support apparatus of claim 8, further comprising a stem coupled to the lower surface of the main body, the stem configured to extend through the opening in the base member to secure the main body and base member together.

10. The support apparatus of claim 9, wherein the cushion member is made from resilient foam.

11. A support apparatus configured to support a hand region of a user in a neutrally aligned position during use of a computer mouse on a flat surface, the support apparatus configured to permit freedom of movement of a thumb, index, middle, ring and pinky fingers of the hand region and conform to a palm portion and a wrist of the hand region, the support apparatus comprising:

a main body comprising an upper concave surface and a lower surface; and a cushion member coupled to the upper concave surface of the main body and comprising a pair of side walls continuously connected to a lower wall to form a generally U-shaped member, the U-shaped member comprising a front end and a rear end opposite the front end, the U-shaped member being asymmetrical due to a slanted cutout that extends from an intermediate portion of the front end of the U-shaped member to an intermediate portion of one of the pair of side walls of the cushion member, the slanted cutout forming a cutout edge in the cushion member that extends along a pathway directed entirely away from the one of the pair of side walls to the intermediate portion of the front end of the U-shaped member, the lower wall of the cushion member comprising a thenar-hypothenar ridge extending from the front end of the U-shaped member to an intermediate portion of the lower wall of the cushion member, a pair of indentations disposed on opposing sides of the thenar-hypothenar ridge, and a distal ridge connecting the pair of side walls of the cushion member together and intersecting the thenar-hypothenar ridge in the lower wall;

wherein the cushion member is configured to receive the hand region of the user so that the intermediate portion of the front end of the U-shaped member is aligned with the middle finger and positioned beneath a central area of the palm portion of the hand region, wherein the cushion member is configured to permit the pair of side walls of the U-shaped member to conform around the wrist, the lower wall of the cushion member is configured to conform to the palm portion with the fingers and thumb extending beyond the front end of the generally U-shaped member, thereby permitting the cushion member to support the hand region of the user in the neutrally aligned position as the fingers and thumb perform work with the computer mouse.

12. The support apparatus of claim 11, wherein the distal ridge is configured to support the wrist of the user.

* * * * *